(12) United States Patent  (10) Patent No.: US 8,335,401 B2
Chen  (45) Date of Patent: Dec. 18, 2012

(54) BLIND BLOCKING ARTIFACT MEASUREMENT APPROACHES FOR DIGITAL IMAGERY

(75) Inventor: Chunhua Chen, Matawan, NJ (US)

(73) Assignee: Dialogic Corporation, Montreal, Quebec (CA)

( * ) Notice: Subject to any disclaimer, the term of this patent is extended or adjusted under 35 U.S.C. 154(b) by 162 days.

(21) Appl. No.: 12/757,389

(22) Filed: Apr. 9, 2010

(65) Prior Publication Data

US 2011/0249892 A1 Oct. 13, 2011

(51) Int. Cl.
  *G06K 9/36* (2006.01)
  *G06K 9/40* (2006.01)
(52) U.S. Cl. .................................. 382/280; 382/275
(58) Field of Classification Search .................. 382/263, 382/275, 280, 232; 348/180
  See application file for complete search history.

(56) References Cited

U.S. PATENT DOCUMENTS

| | | | |
|---|---|---|---|
| 6,437,821 | B1 | 8/2002 | Janko et al. |
| 7,606,423 | B2 | 10/2009 | Caviedes et al. |
| 7,620,262 | B2 | 11/2009 | Kim et al. |
| 2005/0207660 | A1 | 9/2005 | Edgar |
| 2008/0159649 | A1 | 7/2008 | Kempf et al. |
| 2009/0060371 | A1 | 3/2009 | Niedermeier et al. |

FOREIGN PATENT DOCUMENTS

WO  WO 2010/021722  2/2010

OTHER PUBLICATIONS

Zhou Wang, Alan C. Bovik, and Brian L. Evans, "Blind Measurement of Blocking Artifacts in Images", Laboratory for Image and Video Engineering, Dept. of Electrical and Computer Engineering, The University of Texas at Austin, Austin, TX 78712-1084, USA, Sep. 2000.

R. Muijs and I. Kirenko, "A No-Reference Blocking Artifact Measure for Adaptive Video Processing", Philips Research Laboratories, Prof. Holstlaan 4, 5656 AA Eindhoven, The Netherlands, Sep. 2005.

K.T. Tan and M. Ghanbari, "Frequency Domain Measurement of Blockiness in MPEG-2 Coded Video", Dept. of Electronic Systems Engineering, University of Essex, Colchester C043SQ, United Kingdom, Sep. 2000.

*Primary Examiner* — Yon Couso
(74) *Attorney, Agent, or Firm* — Weingarten, Schurgin, Gagnebin & Lebovici LLP

(57) ABSTRACT

Systems and methods of performing quantitative measurements of blocking artifacts in digital images and digital image sequences that are computationally efficient, and that employ no reference information in the measurement process. At least one normalized gradient image array is calculated, with reference to at least one specified gradient direction, from image pixel data contained in an image pixel array derived from a given digital image. The calculated results are accumulated into at least one profile array, and the data contained in the respective profile array is analyzed in the frequency domain to obtain a quantitative measurement of blockiness in the given digital image.

19 Claims, 8 Drawing Sheets

BLIND BLOCKING ARTIFACT MEASUREMENT APPROACHES FOR DIGITAL IMAGERY

CROSS REFERENCE TO RELATED APPLICATIONS

Not applicable

STATEMENT REGARDING FEDERALLY SPONSORED RESEARCH OR DEVELOPMENT

Not applicable

FIELD OF THE INVENTION

The present application relates generally to systems and methods of measuring blocking artifacts in digital images and digital image sequences, and more specifically to systems and methods of performing quantitative measurements of blocking artifacts in digital images and digital image sequences that are computationally efficient, and that employ no reference information in the measurement process.

BACKGROUND OF THE INVENTION

The effect of blocking artifacts (such blocking artifacts are also referred to herein as "blockiness") is a significant factor in assessing the perceptual quality of digital images and digital image sequences, particularly when the digital images and digital image sequences are encoded or compressed to achieve reduced bit rates. For example, in digital still images compressed according to the Joint Photographic Experts Group (JPEG) standards, and in digital image sequences compressed according to the Moving Picture Experts Group (MPEG) standards or the Telecommunication Standardization Sector of the International Telecommunication Union (ITU-T) H.26n standards, frames of digital images are typically divided into a number of blocks of pixels (e.g., 8×8 pixel blocks), and the blocks are subjected to quantization processing, which generally follows the block discrete cosine transform (BDCT) and truncates the high frequency discrete cosine transform (DCT) coefficients. When the encoded digital image signal is later recovered (i.e., decoded or decompressed), blocking artifacts may be produced, causing the boundaries between adjacent blocks (such boundaries are also referred to herein as "block edges") to appear as discontinuities in the decoded digital image signal.

One known technique for measuring blockiness in digital images detects vertical and horizontal blocking artifacts from the contrast characteristics between local and average gradients for the respective digital images. In accordance with this technique, vertical blocking artifacts can be detected by deriving an image pixel array from a decoded digital image signal, generating a normalized horizontal gradient for the digital image by taking the ratio of the absolute local gradient and the average gradient calculated over adjacent columns of the image pixel array, and accumulating the results over all of the rows of the image pixel array. A histogram analysis of the accumulated signal can then be employed to extract the block size and offsets. The accumulated signal is averaged over the block edge locations and intermediate locations, and a measure of the vertical blockiness in the digital image is obtained by taking the ratio of the average values of the accumulated signal at the block edge locations and at the intermediate locations. A measure of the horizontal blockiness in the digital image can also be obtained in an analogous fashion. This technique for measuring blockiness in digital images has drawbacks, however, such as that it requires the locations of the block edges to be precisely determined.

Another known technique for measuring blockiness in digital images represents a decoded digital image signal as a digital image without blockiness that is interfered with a so-called "ideal blocky image signal". In accordance with this technique, a measure of blockiness in the decoded digital image signal is obtained by detecting the ideal blocky image signal, estimating the power spectrum of the ideal blocky image signal, and obtaining the blockiness measurement from an analysis of the peaks in the power spectrum curve. This technique for measuring blockiness in digital images also has drawbacks, however, due to its high computational complexity.

Still another known technique can be used to perform frequency domain measurements of blockiness in digital images. In accordance with this technique, luminance discontinuities are extracted from a digital image using a Sobel operator, which is a conventional image processing routine for performing edge extraction. After segmenting a gradient image into small blocks and applying a 2-dimensional (2-D) discrete Fourier transform (DFT) to the small blocks, blockiness in the digital image is translated into harmonics whose amplitude and phase provide information for quantifying the blockiness. The amplitude of the harmonics is proportional to the degree of blockiness, while the phase of the harmonics can be used to verify that the harmonics are not caused by contextual details in the digital image. The blockiness in the digital image can be detected by examining both the amplitude information and the phase information of the harmonics. This technique for performing frequency domain measurements of blockiness in digital images also has drawbacks, however, due to its computational complexity and the need to determine the precise locations of the block edges.

It would therefore be desirable to have systems and methods of measuring blocking artifacts in digital images and digital image sequences that avoid one or more of the drawbacks of known techniques for measuring blockiness in digital images and digital image sequences.

BRIEF SUMMARY OF THE INVENTION

In accordance with the present application, systems and methods of performing quantitative measurements of blocking artifacts (such blocking artifacts are also referred to herein as "blockiness") in digital images and digital image sequences are disclosed that are computationally efficient, and that employ no reference information in the measurement process. In accordance with the presently disclosed systems and methods, at least one normalized gradient image array is calculated for a pixel array derived from a given digital image, and the calculated results are accumulated into one or more profile arrays. The data contained in the one or more profile arrays are analyzed in the frequency domain to obtain a quantitative measurement of blockiness in the given digital image.

In accordance with one aspect, a system for performing quantitative measurements of blockiness in digital images and digital image sequences includes a plurality of functional components operative to perform corresponding functionalities, including generating a 2-dimensional image pixel array from at least one selected component of a given digital still image or a given single digital image of a digital image sequence, calculating, from the data contained in the image pixel array, one or more 2-dimensional normalized gradient image arrays with reference to one or more specified gradient directions relative to the image pixel array, generating one or more 1-dimensional profile arrays by accumulating the data contained in the one or more normalized gradient image arrays, analyzing the data contained in the one or more profile arrays in the frequency domain to obtain one or more blockiness measurements, pooling or accumulating the one or more blockiness measurements to obtain a quantitative measurement of blockiness in the given digital image, and generating an output indication of the quantitative blockiness measurement. In accordance with one exemplary aspect, the 2-dimensional image pixel array is generated from a luminance component of the given digital image. The normalized gradient image array can be calculated in a horizontal gradient direction by taking the difference between the luminance values of selected horizontally adjacent pairs of pixels in the image pixel array to produce what is referred to herein as a "horizontal gradient image array", taking the absolute values of the data contained in the horizontal gradient image array, and normalizing each such absolute value by the average of a predetermined number of gradient values calculated in the horizontal gradient direction in the vicinity (i.e., to the left and/or to the right) of the respective gradient value in the horizontal gradient image array, as appropriate, while taking into account some subjective perceptual quality assessment of blockiness. In accordance with one exemplary aspect, such a subjective perceptual quality assessment of blockiness can be obtained from a given set of training images. The normalized gradient image array can also be calculated in a vertical gradient direction in an analogous fashion.

In accordance with another exemplary aspect, the data contained in the profile array (also referred to herein as "profile data") is analyzed in the frequency domain by taking the 1-dimensional (1-D) discrete Fourier transform (DFT) of the profile data. Blocking artifacts caused by vertical block edges in the given digital image are referred to herein as "vertical blocking artifacts" or "vertical blockiness", and blocking artifacts caused by horizontal block edges in the given digital image are referred to herein as "horizontal blocking artifacts" or "horizontal blockiness". Measurements of vertical and/or horizontal blockiness in the given digital image can be obtained from the peak magnitudes of the DFT coefficients, while taking into account some subjective perceptual quality assessment of vertical and/or horizontal blockiness. In accordance with one exemplary aspect, such a subjective perceptual quality assessment of vertical and/or horizontal blockiness can be obtained from a given set of training images. In accordance with still another exemplary aspect, the peak magnitudes of the DFT coefficients are calculated using a predetermined block size, or an empirically determined block size, in the appropriate direction relative to the image pixel array. When performing measurements of vertical blockiness in the given digital image, the peak magnitudes of the DFT coefficients are calculated using a predetermined block size, or an empirically determined block size, in the horizontal direction (referred to herein as the "horizontal block size"). When performing measurements of horizontal blockiness in the given digital image, the peak magnitudes of the DFT coefficients are calculated using a predetermined block size, or an empirically determined block size, in the vertical direction (referred to herein as the "vertical block size"). The vertical and horizontal blockiness measurements are pooled or otherwise accumulated to obtain a quantitative measurement of blockiness in the given digital image.

By deriving an image pixel array from a given digital still image or a given single digital image of a digital image sequence, calculating, from the image pixel data, at least one normalized gradient image array with reference to at least one specified gradient direction relative to the image pixel array, analyzing, using the 1-D DFT, at least one profile array generated from the normalized gradient image data, and obtaining at least one blockiness measurement from the peak magnitudes of the DFT coefficients while taking into account some subjective perceptual quality assessment of blockiness, quantitative measurements of blocking artifacts in digital images and digital image sequences can be performed that are computationally efficient, and that employ no reference information in the measurement process.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

Systems and methods of performing quantitative measurements of blocking artifacts (such blocking artifacts are also referred to herein as "blockiness") in digital images and digital image sequences are disclosed that are computationally efficient, and that employ no reference information in the measurement process. In accordance with such disclosed systems and methods, at least one normalized gradient image array is calculated for a pixel array derived from a given digital image, and the calculated results are accumulated into one or more profile arrays. The data contained in the one or more profile arrays are analyzed in the frequency domain to obtain a quantitative measurement of blockiness in the given digital image.

Figure 1:
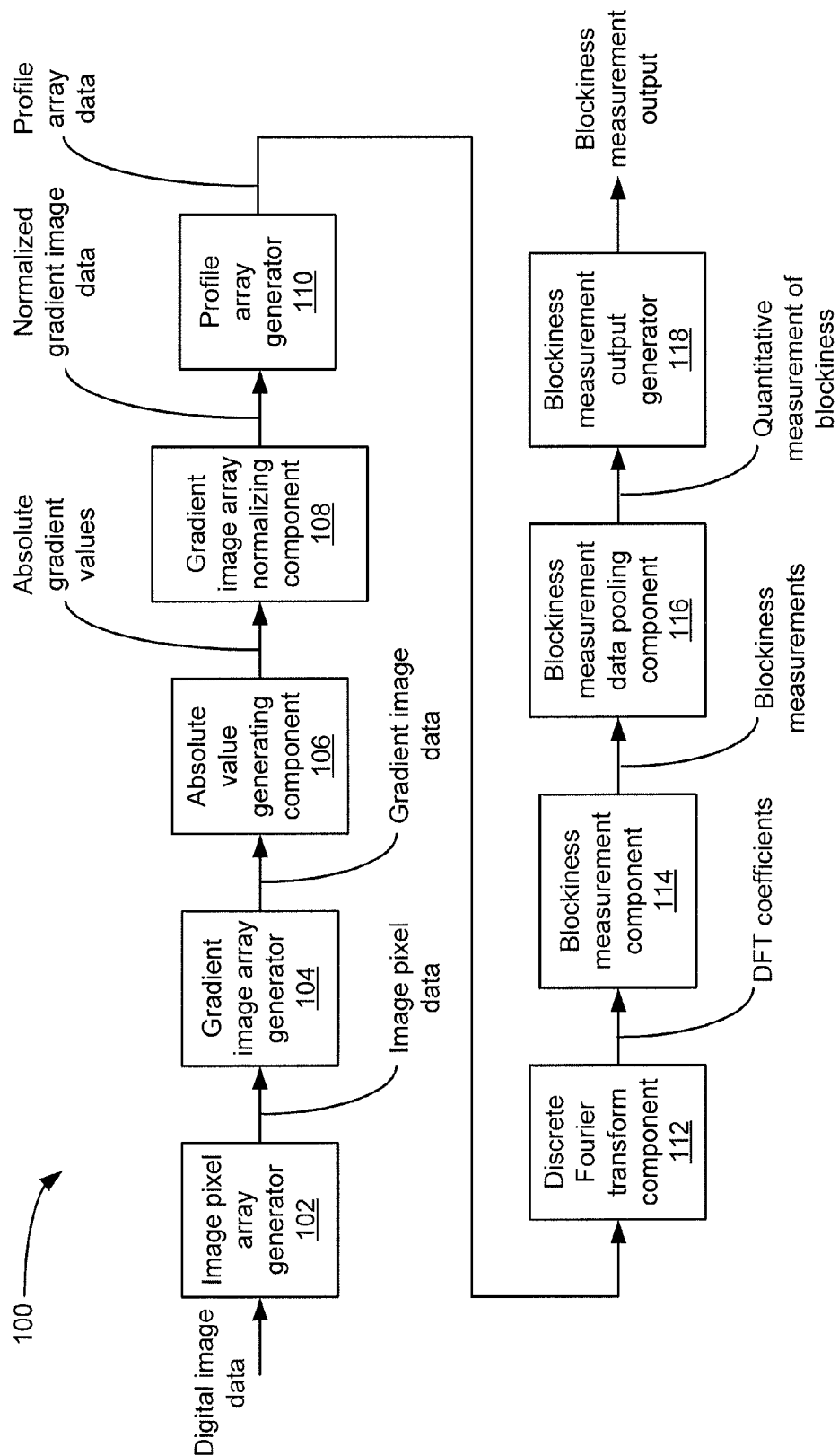
FIG. 1 is a block diagram of an exemplary system for performing quantitative measurements of blocking artifacts in digital images and digital image sequences, according to an exemplary embodiment of the present application.

FIG. 1 depicts an illustrative embodiment of an exemplary system 100 for performing quantitative measurements of blockiness in digital images and digital image sequences, in accordance with the present application. In accordance with the exemplary embodiment, the system 100 has a plurality of functional components, including an image pixel array generator 102, a gradient image array generator 104, an absolute value generating component 106, a gradient image array normalizing component 108, a profile array generator 110, a 1-dimensional (1-D) discrete Fourier transform (DFT) component 112, a blockiness measurement component 114, a blockiness measurement data pooling component 116, and a blockiness measurement output generator 118. As shown in FIG. 1, the image pixel array generator 102 receives digital image data from a given digital image, which can be a digital still image or a single digital image of a digital image sequence. For example, the digital still image may conform to the Joint Photographic Experts Group (JPEG) standards or any other suitable coding/compression standard(s), and the single digital image of the digital image sequence may conform to the Moving Picture Experts Group (MPEG) standards, the Telecommunication Standardization Sector of the International Telecommunication Union (ITU-T) H.26n standards, or any other suitable coding/compression standard(s). The digital image data is derived from at least one component of the digital image, such as the luminance component, Y, the chrominance component, U, the chrominance component, V, the chrominance component, Cb, and/or the chrominance component, Cr. The image pixel array generator 102 generates at least one 2-dimensional image pixel array containing image pixel data from the digital image data, where each image pixel array is generated from a respective component Y, U, V, Cb, or Cr of the given digital image.

As further shown in FIG. 1, the image pixel array generator 102 provides the image pixel data to the gradient image array generator 104, which calculates at least one 2-dimensional gradient image array containing gradient image data from the image pixel data. The gradient image array generator 104 calculates each gradient image array with reference to a specified gradient direction (e.g., vertical, horizontal, main diagonal, or minor diagonal) relative to the respective image pixel array. An exemplary process of calculating a gradient image array with reference to a horizontal gradient direction relative to a given image pixel array is described below with reference to FIG. 4. The absolute value generating component 106 takes the absolute values of the gradient image data, and provides the absolute gradient values to the gradient image array normalizing component 108, which normalizes each absolute gradient value by the average of a predetermined number of gradient values calculated in the specified gradient direction in the vicinity of (e.g., to the left and/or to the right of, or above and/or below) the respective gradient value in the gradient image array, as appropriate, while taking into account some subjective perceptual quality assessment of blockiness. For example, such a subjective perceptual quality assessment of blockiness can be obtained from a given set of training images.

The gradient image array normalizing component 108 provides the normalized gradient image data to the profile array generator 110, which generates at least one 1-dimensional profile array by accumulating the normalized gradient image data. The 1-D DFT component 112 analyzes the profile data in the frequency domain, generating a plurality of DFT coefficients. The blockiness measurement component 114 obtains at least one blockiness measurement in the respective specified gradient direction from the peak magnitudes of the DFT coefficients, taking into account some subjective perceptual quality assessment of blockiness. For example, such a subjective perceptual quality assessment of blockiness with reference to the specified gradient direction can be obtained from a given set of training images. The blockiness measurement component 114 provides the blockiness measurements to the blockiness measurement data pooling component 116, which pools or otherwise accumulates the blockiness measurement data, as appropriate, to obtain a quantitative measurement of blockiness in the given digital image. The blockiness measurement output generator 118 generates a quantitative measurement of blockiness in the digital image from the pooled or accumulated blockiness measurement data, and provides an indication of the blockiness measurement as output.

The presently disclosed systems and methods of performing quantitative measurements of blockiness in digital images and digital image sequences will be further understood with reference to the following illustrative example and FIGS. 2a-6. In this illustrative example, a 2-dimensional image pixel array is generated from the luminance component, Y, of a given digital image, which can be a digital still image or a single digital image of a digital image sequence. Further, a gradient image array is calculated with reference to a horizontal gradient direction relative to the image pixel array, producing what is referred to herein as a "horizontal gradient image array". It is noted, however, that, in accordance with one or more alternative embodiments, one or more 2-dimensional image pixel arrays may be generated from the luminance component, Y, the chrominance component, U, the chrominance component, V, the chrominance component, Cb, and/or the chrominance component, Cr, of the given digital image, and that one or more gradient image arrays may be calculated with reference to the vertical gradient direction, the horizontal gradient direction, the main diagonal gradient direction, and/or the minor diagonal direction, among others, relative to the image pixel array.

Figure 2A:
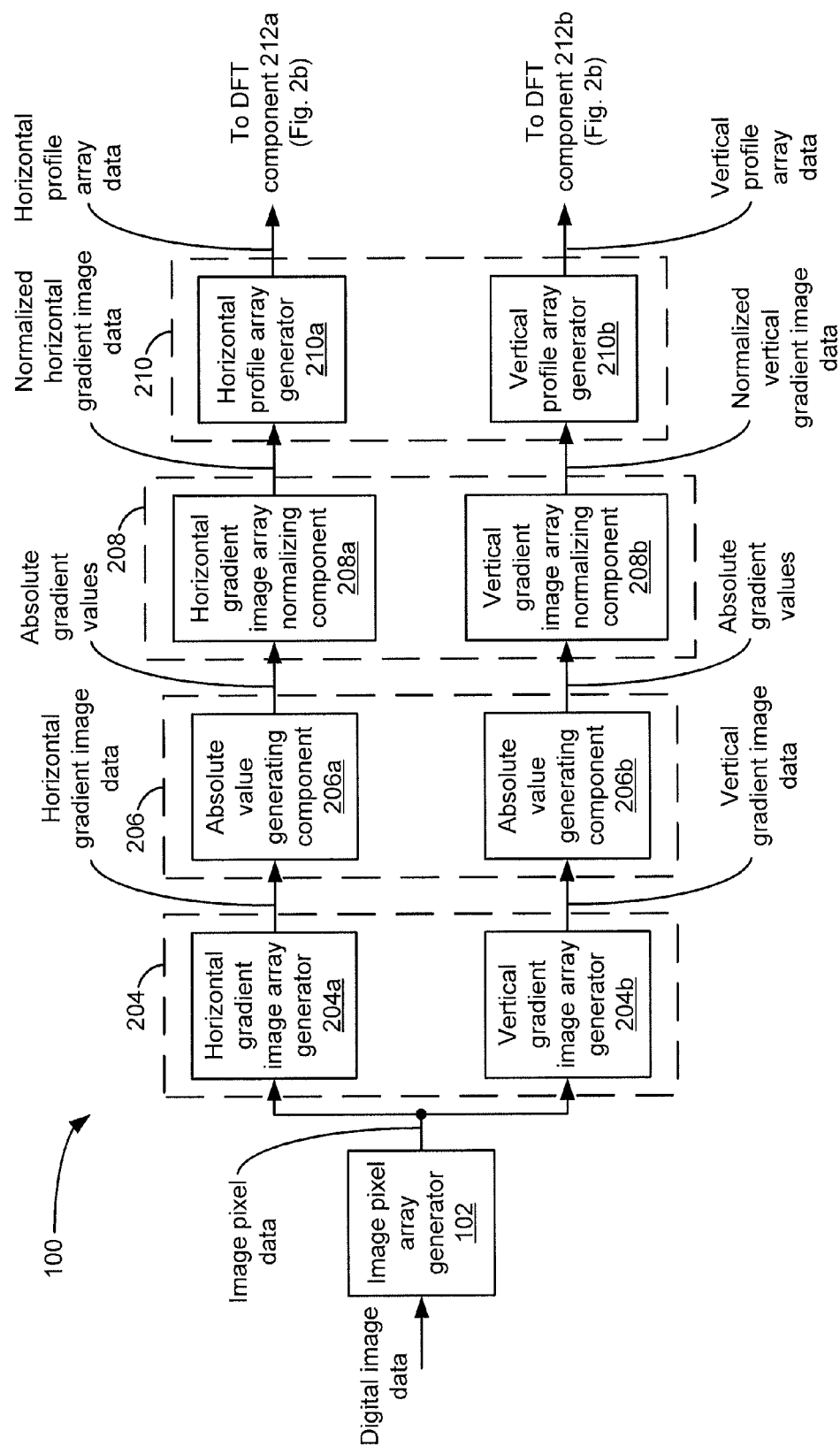
FIGS. 2a and 2b are block diagrams of the system of FIG. 1, including exemplary implementations of functional components for calculating exemplary horizontal and vertical gradient image arrays from image pixel data, for taking the absolute values of data contained in the exemplary horizontal and vertical gradient image arrays, for normalizing each absolute gradient value in the respective exemplary gradient image arrays, for generating exemplary profile arrays from normalized horizontal and vertical gradient image data, for taking the 1-dimensional (1-D) discrete Fourier transform (DFT) of data contained in the exemplary profile arrays, and for obtaining vertical and horizontal blockiness measurements using DFT coefficients.

Also in accordance with this illustrative example, the exemplary system 100 (see FIGS. 1, 2a, and 2b) for performing quantitative measurements of blockiness in digital images and digital image sequences has a plurality of functional components, including the image pixel array generator 102, the blockiness measurement data pooling component 116, the blockiness measurement output generator 118, and exemplary implementations of a gradient image array generator 204, an absolute value generating component 206, a gradient image array normalizing component 208, a profile array generator 210, a 1-D DFT component 212, and a blockiness measurement component 214. As shown in FIG. 2a, the image pixel array generator 102 receives digital image data, which is derived from the luminance component, Y, of the given digital image. Further, the image pixel array generator 102 generates a 2-dimensional image pixel array containing image pixel data from the luminance component, Y, of the given digital image.

Figure 2B:
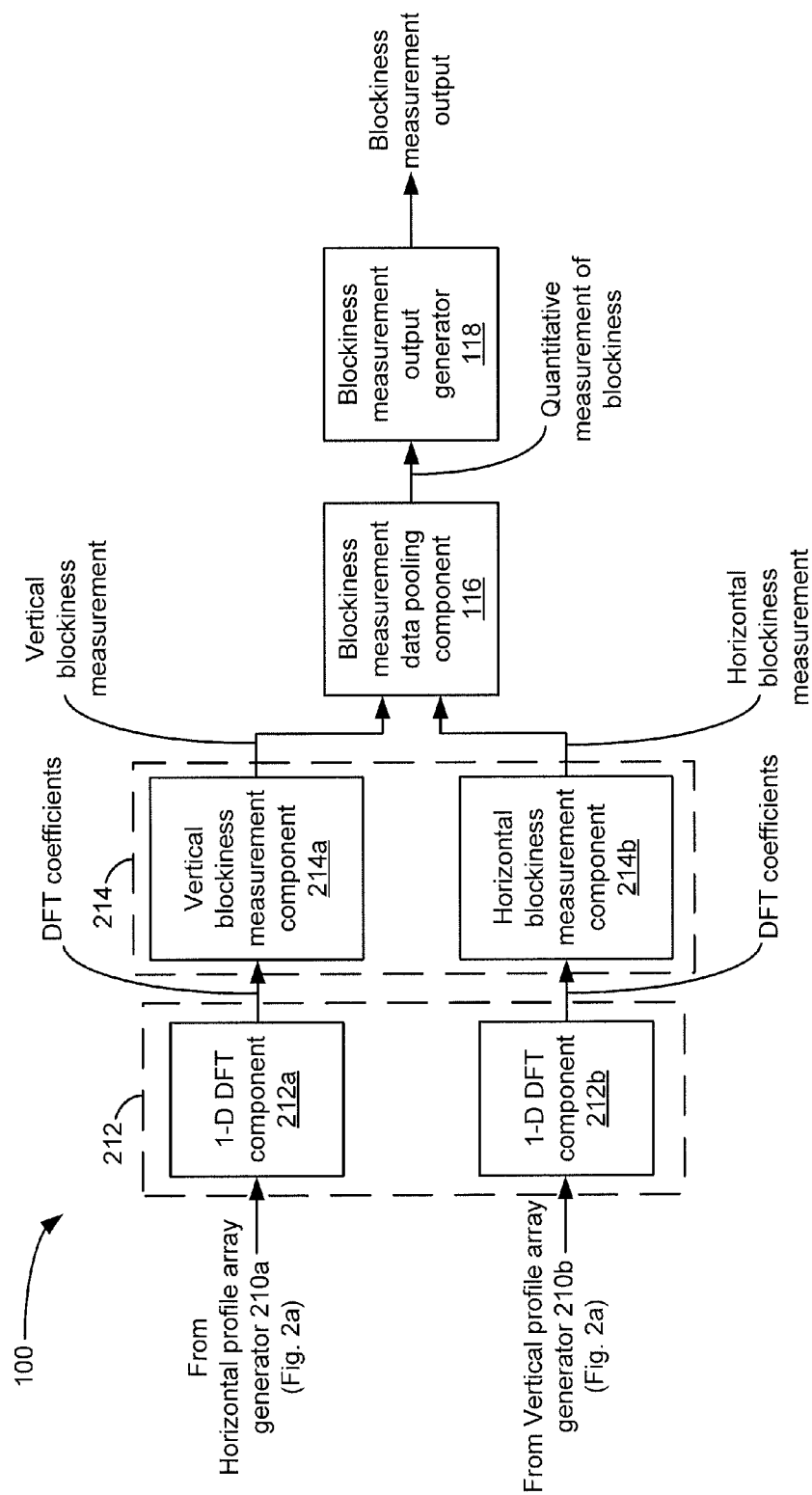

As further shown in FIG. 2a, the gradient image array generator 204 includes a horizontal gradient image array generator 204a and a vertical gradient image array generator 204b; the absolute value generating component 206 includes a plurality of absolute value generating components 206a and 206b; the gradient image array normalizing component 208 includes a horizontal gradient image array normalizing component 208a and a vertical gradient image array normalizing component 208b; and, the profile array generator 210 includes a horizontal profile array generator 210a and a vertical profile array generator 210b. As shown in FIG. 2b, the 1-D DFT component 212 includes a plurality of 1-D DFT components 212a and 212b, and the blockiness measurement component 214 includes a vertical blockiness measurement component 214a and a horizontal blockiness measurement component 214b.

In accordance with the illustrated embodiment, the functional components 204a, 206a, 208a, 210a, 212a, and 214a are operative to obtain a vertical blockiness measurement from the image pixel data, and the functional components 204b, 206b, 208b, 210b, 212b, and 214b are operative to obtain a horizontal blockiness measurement from the image pixel data. It is noted, however, that, in accordance with one or more alternative embodiments, the system 100 of FIGS. 1, 2a, and 2b may be configured to obtain a measurement of blockiness in a given digital image with reference to the main diagonal direction, the minor diagonal direction, and/or any other suitable direction relative to the image pixel array derived from the given digital image. In accordance with this illustrative example, an exemplary technique of obtaining a vertical blockiness measurement is described, using the functional components 102, 204a, 206a, 208a, 210a, 212a, 214a, 116, and 118 of the system 100. It is noted that a horizontal blockiness measurement can be obtained using the functional components 102, 204b, 206b, 208b, 210b, 212b, 214b, 116, and 118 of the system 100.

Figure 3:
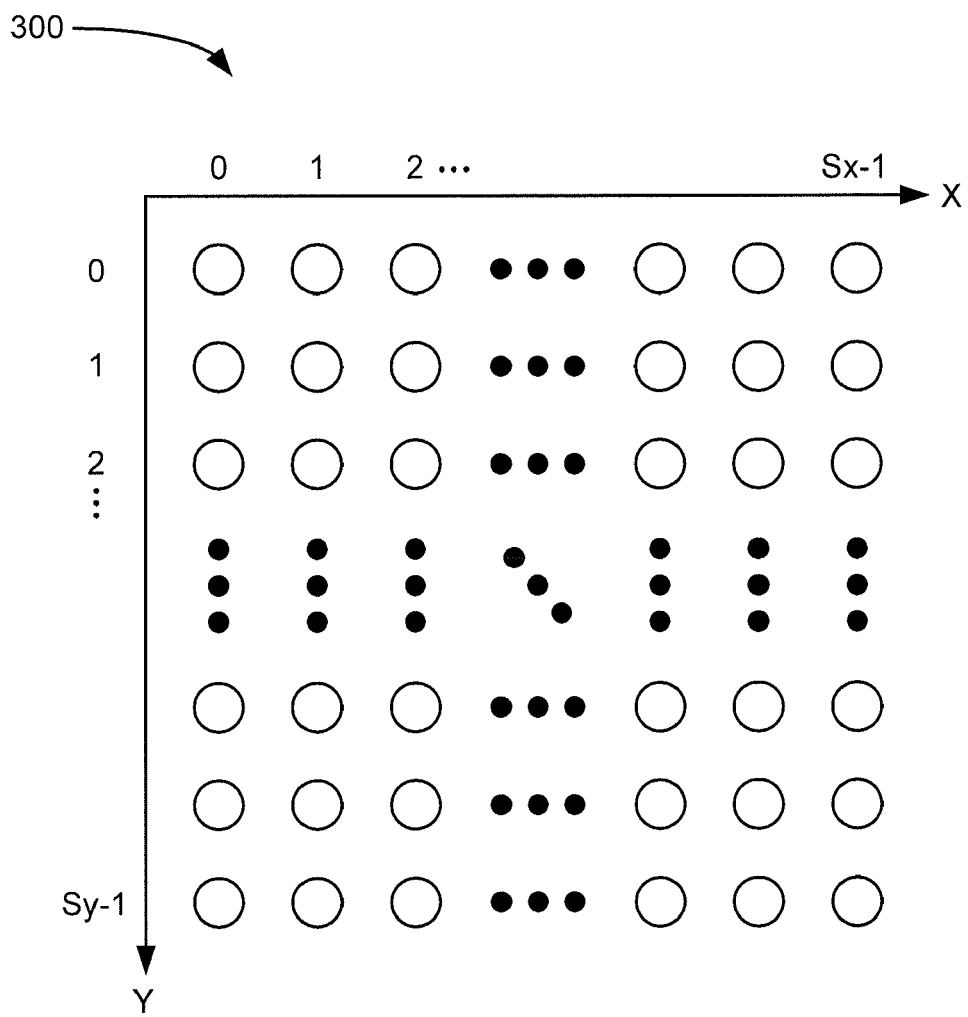
FIG. 3 is a diagram of the exemplary image pixel array generated using the system of FIGS. 2a and 2b.

FIG. 3 depicts an exemplary 2-dimensional image pixel array 300 generated by the image pixel array generator 102 of FIG. 2a. As shown in FIG. 3, the image pixel array 300 is depicted relative to the horizontal coordinate axis "x" (the "x-axis") and the vertical coordinate axis "y" (the "y-axis"). Accordingly, in this example, the image pixel array 300 is denoted as "I(x,y)", where $0 \leq x \leq (Sx-1)$, $0 \leq y \leq (Sy-1)$, where "Sx" is the width in pixels in the horizontal direction of a frame containing the given digital image, and where "Sy" is the height in pixels in the vertical direction of the frame containing the given digital image.

Figure 4:
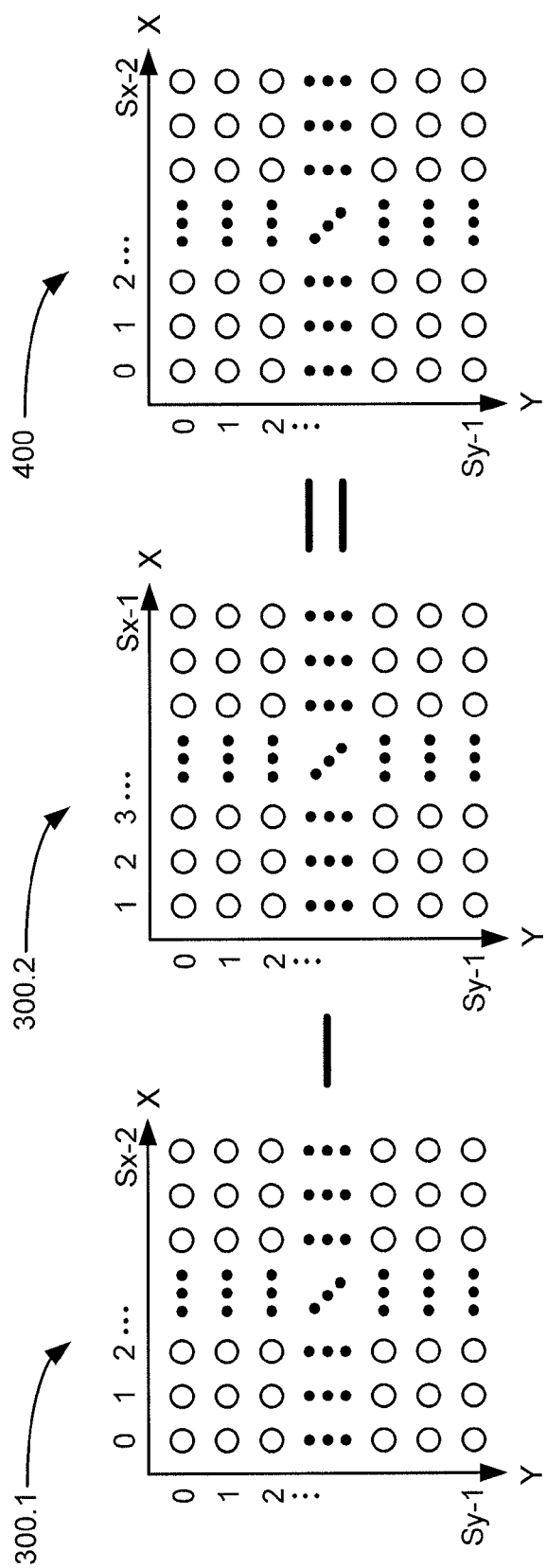
FIG. 4 is a diagram illustrating a process of calculating the exemplary horizontal gradient image array from the image pixel data of FIG. 3, using the system of FIGS. 2a and 2b.

Blocking artifacts caused by vertical block edges in the given digital image are referred to herein as "vertical blocking artifacts" or "vertical blockiness", and blocking artifacts caused by horizontal block edges in the given digital image are referred to herein as "horizontal blocking artifacts" or "horizontal blockiness". To obtain the vertical blockiness measurement, the gradient image array generator 204a (see FIG. 2a) calculates a gradient image array with reference to the horizontal gradient direction relative to the image pixel array 300 (see FIG. 3), thereby producing a horizontal gradient image array 400 (see FIG. 4). In this illustrative example, the gradient image array generator 204a produces the horizontal gradient image array 400 by taking the difference between the values of the luminance component, Y, of horizontally adjacent pairs of pixels in the image pixel array 300. Specifically, and as shown in FIG. 4, the pixels contained in the image pixel array 300 can be arranged as a 2-dimensional image pixel array 300.1, and as a 2-dimensional image pixel array 300.2. In this illustrative example, the image pixel array 300.1 is denoted as "$I_1(x,y)$", where $I_1(x,y)=I(x,y)$, $0 \leq x \leq (Sx-2)$, and $0 \leq y \leq (Sy-1)$.

Further, the image pixel array 300.2 is denoted as "$I_2(x,y)$", where $I_2(x,y)=I(x+1,y)$, $0 \leq x \leq (Sx-2)$, and $0 \leq y \leq (Sy-1)$.

As a result, the pixels contained in the image pixel array 300.1 (see FIG. 4), and the corresponding pixels contained in the image pixel array 300 (see FIG. 3), are disposed in the same locations within the respective pixel arrays. However, the pixels contained in the image pixel array 300.2 (see FIG. 4) are shifted horizontally to the "left" by one pixel location relative to their corresponding locations in the image pixel array 300 (see FIG. 3). To produce the horizontal gradient image array 400, the gradient image array generator 204a subtracts the values of the luminance component, Y, of the pixels contained in the image pixel array 300.2 from the values of the luminance component, Y, of the pixels disposed at the corresponding pixel locations within the image pixel array 300.1, thereby effectively taking the difference between the values of the luminance component, Y, of the horizontally adjacent pairs of pixels at x,y locations (0,0) and (1,0), (1,0) and (2,0), (2,0) and (3,0), etc., in a first row of the image pixel array 300, the horizontally adjacent pairs of pixels at x,y locations (0,1) and (1,1), (1,1) and (2,1), (2,1) and (3,1), etc., in a second row of the image pixel array 300, the horizontally adjacent pairs of pixels at x,y locations (0,2) and (1,2), (1,2) and (2,2), (2,2) and (3,2), etc., in a third row of the image pixel array 300, and so on, for the remaining rows of the image pixel array 300. In accordance with this illustrative example, the bit depth is 8. The value of the luminance component, Y, is therefore an integer value in the range of 0 to 255, and each of the elements of the horizontal gradient image array 400 can have an integer value in the range of −255 to +255. It is noted, however, that any other suitable value for the bit depth may be employed. The absolute value generating component 206a takes the absolute values of the data contained in the horizontal gradient image array 400.

It is further noted that, to obtain the horizontal blockiness measurement, the gradient image array generator 204b (see FIG. 2a) calculates a gradient image array with reference to the vertical gradient direction relative to the image pixel array 300 (see FIG. 3), thereby producing what is referred to herein as a "vertical gradient image array". In this illustrative example, the gradient image array generator 204b produces the vertical gradient image array by taking the difference between the values of the luminance component, Y, of vertically adjacent pairs of pixels in the image pixel array 300. Further, for a bit depth of 8, each of the elements of the vertical gradient image array can have an integer value in the range of −255 to +255. The absolute value generating component 206b takes the absolute values of the data contained in the vertical gradient image array.

In this example, the horizontal gradient image array 400 is denoted as "D(x,y)", where $0 \leq x \leq (Sx-2)$, and $0 \leq y \leq (Sy-1)$.

Further, the operations of taking the difference between the values of the luminance component, Y, of horizontally adjacent pairs of pixels in the image pixel array 300, and taking the absolute values of the data contained in the horizontal gradient image array 400, are expressed as $$Dc(x,y)=|I(x,y)-I(x+1,y)|, \qquad (1)$$

where $0 \leq x \leq (Sx-2)$, and $0 \leq y \leq (Sy-1)$.

The gradient image array normalizing component 208a normalizes each absolute gradient value by the average of a predetermined number of gradient values calculated in the horizontal gradient direction in the vicinity (i.e., to the left and/or to the right) of the respective gradient value in the horizontal gradient image array 400, as appropriate, while taking into account some subjective perceptual quality assessment of vertical blockiness. In this example, the gradient image array normalizing component 208a calculates a normalized gradient image array denoted as "Dcn(x,y)", where $0 \leq x \leq (Sx-2)$, and $0 \leq y \leq (Sy-1)$.

Further, each normalized absolute gradient value contained in the normalized gradient image array Dcn(x,y) is calculated in accordance with the expression $$Dcn(x, y) = \frac{Dc(x, y)}{\sqrt[p]{\frac{1}{2N} \sum_{i \in [-N,N], i \neq 0} [Dc(x+i, y)]^p}}, \quad (2)$$

where "Dc(x,y)" is calculated in accordance with equation (1) above, where "N" is the predetermined number of gradient values calculated in the horizontal gradient direction to the left and/or to the right of the respective gradient value in the horizontal gradient image array 400, and where "p" is a parameter that can be adjusted to accommodate the best correlation to some subjective perceptual quality assessment of vertical blockiness. For example, N may be equal to 2 or any other suitable value, and p may be equal to 2 or any other suitable value.

It is noted that, when obtaining the horizontal blockiness measurement, the gradient image array normalizing component 208b (see FIG. 2a) normalizes each absolute gradient value contained in the vertical gradient image array by the average of a predetermined number of gradient values calculated in the vertical gradient direction above and/or below the respective gradient value in the vertical gradient image array, as appropriate, while taking into account some subjective perceptual quality assessment of horizontal blockiness.

Figure 5:
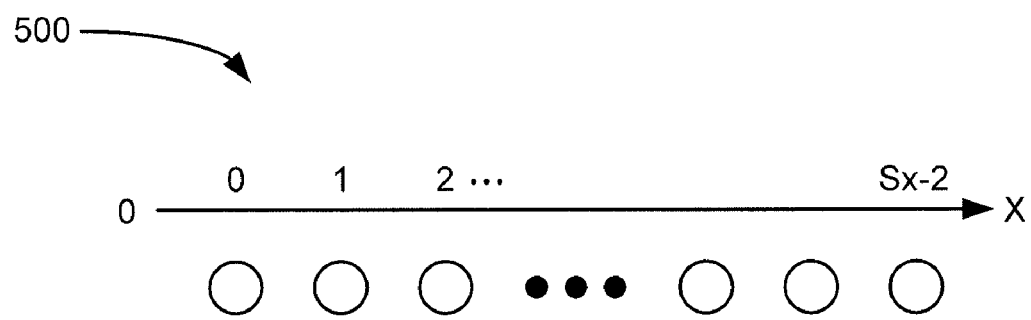
FIG. 5 is a diagram of the exemplary profile array generated from the normalized horizontal gradient image data, using the system of FIGS. 2a and 2b.

FIG. 5 depicts an exemplary 1-dimensional profile array 500 (referred to herein as the "horizontal profile array") generated by the horizontal profile array generator 210a (see FIG. 2a) from the normalized gradient image data contained in the normalized gradient image array, which was calculated by the gradient image array normalizing component 208a. In this example, the horizontal profile array generator 210a generates the horizontal profile array 500 by effectively summing the data values in each column of the normalized gradient image array. As shown in FIG. 5, the horizontal profile array 500 is depicted relative to the x-axis. Accordingly, in this example, the horizontal profile array 500 is denoted as "$P_H(x)$", where $$P_H(x) = \sum_{y=0}^{Sy-1} Dcn(x, y), \quad (3)$$

$0 \leq x \leq (Sx-2)$, and where "Dcn(x,y)" is calculated in accordance with equation (2) above. It is noted that, when obtaining the horizontal blockiness measurement, the vertical profile array generator 210b (see FIG. 2a) generates what is referred to herein as a "vertical profile array", effectively summing the data values in each row of the normalized gradient image array calculated by the gradient image array normalizing component 208b to produce the 1-dimensional vertical profile array.

The 1-D DFT component 212a (see FIG. 2b) analyzes the profile data contained in the horizontal profile array 500 (see FIG. 5) in the frequency domain by taking the 1-dimensional (1-D) discrete Fourier transform (DFT) of the profile data. In this illustrative example, the magnitude of the DFT coefficient of the horizontal profile data is denoted as "$FP_H(X)$", which is expressed as $$FP_H(X) = \left| \sum_{x=0}^{Sx-2} P_H(x) e^{\frac{j2\pi}{Sx-1} xX} \right|, \quad (4)$$

$0 \leq X \leq (Sx-2)$, where "$P_H(x)$" is calculated in accordance with equation (3) above, and where "Sx" is the width in pixels in the horizontal direction of the frame containing the given digital image. The 1-D DFT component 212b (see FIG. 2b) analyzes the profile data contained in the vertical profile array in the frequency domain.

Figure 6:
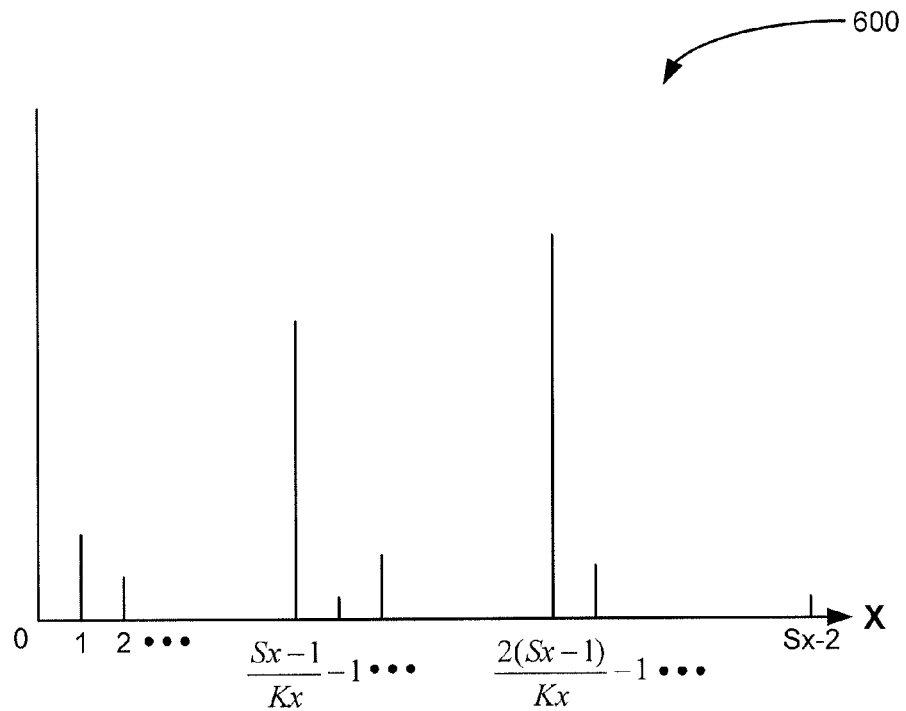
FIG. 6 is a diagram of magnitudes of exemplary DFT coefficients obtained by taking the 1-D DFT of the data contained in the exemplary profile array of FIG. 5, using the system of FIGS. 2a and 2b.

FIG. 6 depicts magnitudes of exemplary DFT coefficients 600 calculated in accordance with equation (4) above. As shown in FIG. 6, the magnitudes of the DFT coefficients 600 are depicted relative to the horizontal coordinate axis "X" (the "X-axis"), where X is the argument of the function $FP_H(X)$ defined by equation (4) above. As further shown in FIG. 6, the magnitudes of the DFT coefficients 600 have peak values at the following locations along the X-axis:

$$X = \frac{Sx-1}{Kx}, \frac{2(Sx-1)}{Kx}, \ldots, \frac{(Kx-1)(Sx-1)}{Kx},$$

where "Sx" is the width in pixels in the horizontal direction of the frame containing the given digital image, and where "Kx" is the block size in pixels in the horizontal direction (referred to herein as the "horizontal block size") for the given digital image. It is noted that the peak magnitudes of the DFT coefficients 600 obtained from the analysis of the horizontal profile data by the 1-D DFT component 212a, as depicted in FIG. 6, correlate with the level of vertical blockiness in the given digital image. Similarly, the peak magnitudes of the DFT coefficients obtained from the analysis of the vertical profile data by the 1-D DFT component 212b correlate with the level of horizontal blockiness in the given digital image.

The vertical blockiness measurement component 214a (see FIG. 2b) receives the DFT coefficients 600 from the 1-D DFT component 212a, and calculates a measurement of the vertical blockiness (referred to herein as the "vertical blockiness measurement") in the given digital image from the peak magnitudes of the DFT coefficients 600. In this illustrative example, the vertical blockiness measurement is denoted as "$BM_V$", which is expressed as $$BM_V = \frac{\sqrt[q]{\frac{1}{Kx-1}\left\{\sum_{i=1}^{Kx-1}\left[FP_H\left(i\frac{Sx-1}{Kx}-1\right)\right]^q\right\}}}{FP_H(0)}, \quad (5)$$

where

"$FP_H\left(i\frac{Sx-1}{Kx}-1\right)$"

and "$FP_H(0)$" are calculated in accordance with equation (4) above, where $FP_H(0)$ corresponds to the magnitude of the DFT coefficient at X equal to 0 (i.e., the "DC value"), where "Kx" is the horizontal block size, and where "q" is a parameter that can be adjusted to accommodate the best correlation to some subjective perceptual quality assessment of vertical blockiness. For example, q may be equal to 2 or any other suitable value. The horizontal blockiness measurement component 214b (see FIG. 2b) receives the DFT coefficients generated by the 1-D DFT component 212b, and calculates a measurement of the horizontal blockiness (referred to herein as the "horizontal blockiness measurement" and denoted as "$BM_H$") in the given digital image from the peak magnitudes of the DFT coefficients.

The blockiness measurement data pooling component 116 receives the vertical blockiness measurement, $BM_V$, from the vertical blockiness measurement component 214a, and the horizontal blockiness measurement, $BM_H$, from the horizontal blockiness measurement component 214b, and pools or otherwise accumulates the vertical and horizontal blockiness measurements, $BM_V$ and $BM_H$, using any suitable data pooling or accumulating technique, thereby obtaining a quantitative measurement of blockiness in the given digital image. In this example, the quantitative measurement of blockiness is denoted as "BM", which is expressed as $$BM = \sqrt{rBM_V^2 + (1-r)BM_H^2}, \quad (6)$$

where "$BM_V$" is the vertical blockiness measurement calculated in accordance with equation (5) above, where "$BM_H$" is the horizontal blockiness measurement, and where "r" is a parameter that can be adjusted to accommodate the best correlation to some subjective perceptual quality assessment of blockiness. For example, r may be equal to 0.5770328 or any other suitable value.

As described above, the given digital image can be a digital still image or a single digital image of a digital image sequence. To obtain a quantitative measurement of blockiness for an entire digital image sequence, the technique described in this illustrative example can be employed for each digital image in the digital image sequence, and the resulting quantitative blockiness measurements for the respective digital images can be averaged, for example, to obtain the quantitative blockiness measurement for the entire digital image sequence.

It is noted that the vertical blockiness measurement, $BM_V$, can be calculated both when the value of the horizontal block size, Kx, is known, and when the value of the horizontal block size, Kx, is initially unknown. For example, when the value of the horizontal block size, Kx, is known, the known value for Kx may be employed in equation (5) above to calculate the vertical blockiness measurement, $BM_V$. The horizontal blockiness measurement, $BM_H$, can also be calculated both when the value of the vertical block size is known, and when the value of the vertical block size is initially unknown.

In accordance with this illustrative example, an empirical approach can be employed to obtain values for the horizontal and vertical block sizes when such horizontal and vertical block sizes are initially unknown, thereby obviating the need for any reference information (e.g., the horizontal block size, the vertical block size, the locations of the block edge origins in the horizontal and vertical directions, etc.) in the measurement process. To empirically determine a value for the horizontal block size, Kx, when the horizontal block size, Kx, is initially unknown, an assumption is made that the horizontal block size, Kx, in pixels corresponds to an integer value in the range of 2 to BS, where "BS" is a predetermined maximum block size. For example, the predetermined maximum block size BS may be 8 pixels, 16 pixels, 32 pixels, or any other suitable number of pixels. For each value of the horizontal block size, Kx, in the range of 2 to BS, the corresponding vertical blockiness measurement, $BM_V$, is calculated, in accordance with equation (5) above. For example, using equation (5) above, the vertical blockiness measurement, "$BM_V(Kx=2)$", is calculated for Kx equal to 2, the vertical blockiness measurement, "$BM_V(Kx=3)$", is calculated for Kx equal to 3, the vertical blockiness measurement, "$BM_V(Kx=4)$", is calculated for Kx equal to 4, and so on, to the vertical blockiness measurement, "$BM_V(Kx=BS)$", which is calculated for Kx equal to BS. The maximum vertical blockiness measurement is determined from the measurements $BM_V(Kx=2)$, $BM_V(Kx=3)$, $BM_V(Kx=4)$, and so on, to $BM_V(Kx=BS)$, and the value of Kx corresponding to the maximum vertical blockiness measurement is designated as the value of the horizontal block size, Kx. For example, if it is determined that $BM_V(Kx=8)$ corresponds to the maximum vertical blockiness measurement, then Kx equal to 8 is designated as the horizontal block size value. It is noted that the value of the vertical block size can be empirically determined in an analogous fashion. The vertical blockiness measurement, $BM_V$, can then be calculated using the empirically determined value for the horizontal block size, Kx, and equation (5) above. The horizontal blockiness measurement, $BM_H$, can also be calculated using the empirically determined value of the vertical block size.

Figure 7:
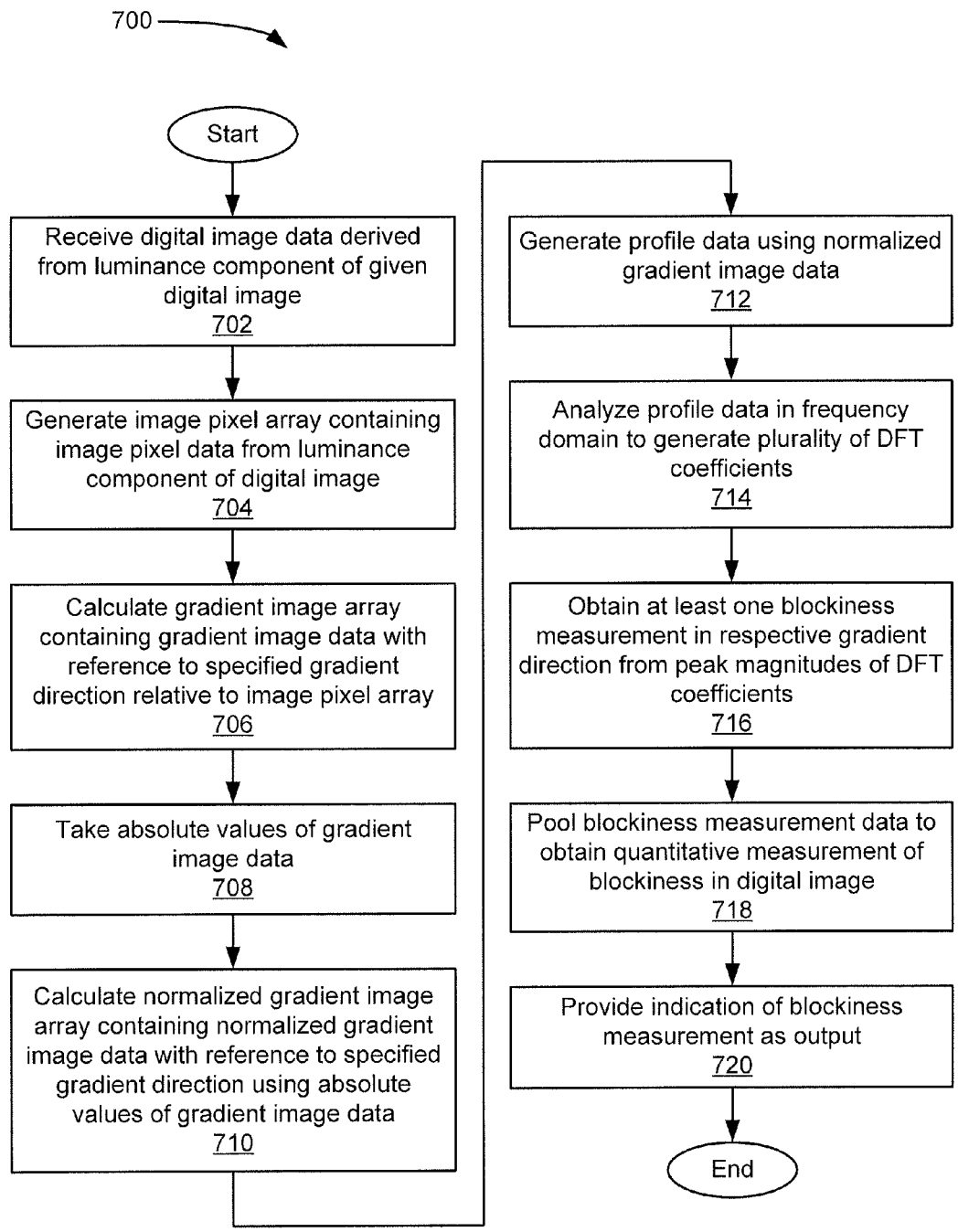
FIG. 7 is a flow diagram illustrating an exemplary method of performing a quantitative measurement of blockiness in a given digital image, according to an exemplary embodiment of the present application.

An illustrative method 700 of performing quantitative measurements of blockiness in digital images and digital image sequences is described below with reference to FIG. 7. It is noted that the illustrative method 700 of FIG. 7 can be performed, for example, by using the system 100 of FIG. 1. As depicted in step 702 (see FIG. 7), digital image data derived from the luminance component, Y, of a given digital image is received by the image pixel array generator 102 (see FIG. 1). In accordance with step 704, a 2-dimensional image pixel array containing image pixel data is generated by the image pixel array generator 102 from the luminance component, Y, of the given digital image. As called for by step 706, a 2-dimensional gradient image array containing gradient image data is calculated with reference to a specified gradient direction relative to the image pixel array by the gradient image array generator 104, using the image pixel data. As depicted in step 708, absolute values of the gradient image data are taken by the absolute value generating component 106. In step 710, a 2-dimensional normalized gradient image array containing normalized gradient image data is calculated with reference to the specified gradient direction by the gradient image array normalizing component 108, using the absolute values of the gradient image data. In accordance with step 712, a 1-dimensional profile array containing profile data is generated by the profile array generator 110, using the normalized gradient image data. As called for by step 714, the profile data is analyzed in the frequency domain by the 1-D DFT component 112 to generate a plurality of DFT coefficients. In step 716, at least one blockiness measurement in the respective gradient direction is obtained from the peak magnitudes of the DFT coefficients. As depicted in step 718, blockiness measurement data is pooled by the blockiness measurement data pooling component 116 to obtain a quantitative measurement of blockiness in the given digital image. As denoted by step 720, an indication of the blockiness measurement is provided as output by the blockiness measurement output generator 118, using any suitable output component or device.

By deriving an image pixel array from a given digital image, calculating, from the image pixel data, at least one normalized gradient image array with reference to at least one specified gradient direction relative to the image pixel array, analyzing, using the 1-D DFT, at least one profile array generated from the normalized gradient image data, and obtaining at least one blockiness measurement from the peak magnitudes of the DFT coefficients while taking into account some subjective perceptual quality assessment of blockiness, the presently disclosed systems and methods can obtain quantitative measurements of blocking artifacts in digital images and digital image sequences by pooling or otherwise accumulating the blockiness measurement data. The resulting blockiness measurement can be beneficially obtained in a computationally efficient manner, without employing any reference information in the measurement process.

It will be appreciated by those of ordinary skill in the art that one or more of the functions necessary to implement the above-described systems and methods of performing quantitative measurements of blockiness in digital images and digital image sequences can be embodied—in whole or in part—in hardware, software, or some suitable combination of hardware and software, using programmable micro-controllers, microprocessors, digital signal processors, and/or logic arrays, read-only memory (ROM), random access memory (RAM), CD-ROM, personal computers and computer displays, and/or any other suitable hardware and/or software programs, components, and/or devices.

It will be further appreciated by those skilled in the art that modifications to and variations of the above-described systems and methods may be made without departing from the inventive concepts disclosed herein. Accordingly, the invention should not be viewed as limited except as by the scope and spirit of the appended claims.

What is claimed is:

1. A system for measuring blocking artifacts in a digital image, the digital image being divided into a plurality of blocks and having luminance components and chrominance components, the system comprising:
    at least one memory; and
    at least one processor operative to execute at least one computer program out of the at least one memory:
    to generate, from one of the luminance and chrominance components of the digital image, image pixel data in an image pixel array corresponding to the digital image, the image pixel array having a plurality of pixel locations for pixel values of the image pixel data;
    to calculate gradient image data in a gradient image array from the image pixel data, the gradient image array containing a plurality of gradient values of the gradient image data, each of the plurality of gradient values corresponding to a respective gradient value calculated in a specified direction for a respective pair of adjacent pixel locations in the image pixel array;
    to calculate normalized gradient image data in a normalized gradient image array from the plurality of gradient values contained in the gradient image array, the normalized gradient image array containing a plurality of normalized gradient values of the normalized gradient image data;
    to generate profile data by accumulating the plurality of normalized gradient values contained in the normalized gradient image array with reference to the specified direction;
    to apply a 1-dimensional (1-D) discrete Fourier transform (DFT) to the profile data to generate a plurality of DFT coefficients;
    to establish a range of block size values for the plurality of blocks in the specified direction;
    for each block size value, to generate an initial measurement of blocking artifacts in the digital image from peak magnitudes of the DFT coefficients, thereby obtaining a plurality of initial blocking artifact measurements;
    to designate a maximum one of the plurality of initial blocking artifact measurements as a final measurement of blocking artifacts in the digital image; and
    to generate an output indicative of the final measurement of blocking artifacts in the digital image.

2. The system of claim 1 wherein the at least one processor is further operative to execute the at least one computer program out of the at least one memory to calculate the normalized gradient image data based at least in part on a predetermined subjective perceptual quality assessment of blocking artifacts.

3. The system of claim 1 wherein the at least one processor is further operative to execute the at least one computer program out of the at least one memory to generate the final measurement of blocking artifacts in the digital image from the peak magnitudes of the DFT coefficients based at least in part on a predetermined subjective perceptual quality assessment of blocking artifacts.

4. The system of claim 1 wherein the at least one processor is further operative to execute the at least one computer program out of the at least one memory to generate a plurality of measurements of blocking artifacts in the digital image with reference to a plurality of specified directions, and to pool data corresponding to the plurality of measurements of blocking artifacts to generate an overall measurement of blocking artifacts in the digital image.

5. The system of claim 4 wherein the at least one processor is further operative to execute the at least one computer program out of the at least one memory to pool the data corresponding to the plurality of measurements of blocking artifacts to generate the overall measurement of blocking artifacts in the digital image based at least in part on a predetermined subjective perceptual quality assessment of blocking artifacts.

6. The system of claim 1 wherein the specified direction corresponds to one of a vertical direction, a horizontal direction, a main diagonal direction, and a minor diagonal direction.

7. The system of claim 1 wherein the at least one processor is further operative to execute the at least one computer program out of the at least one memory to generate absolute values of the gradient image data to produce a plurality of absolute gradient values, and to calculate the normalized gradient image data by normalizing each absolute gradient value by an average of a specified number of gradient values calculated in the specified direction in a vicinity of the respective gradient value in the gradient image array.

8. The system of claim 1 wherein the digital image comprises a digital still image conforming to the JPEG standards.

9. The system of claim 1 wherein the digital image comprises a single digital image of an image sequence conforming to the MPEG or ITU-T H.26n standards.

10. A method of measuring blocking artifacts in a digital image, the digital image being divided into a plurality of blocks and having luminance components and chrominance components, the method comprising the steps of:
   generating, by a computerized image pixel array generator from one of the luminance and chrominance components of the digital image, image pixel data in an image pixel array corresponding to the digital image, the image pixel array having a plurality of pixel locations for pixel values of the image pixel data;
   calculating, by a computerized gradient image array generator from the image pixel data, gradient image data in a gradient image array, the gradient image array containing a plurality of gradient values of the gradient image data, each of the plurality of gradient values corresponding to a respective gradient value calculated in a specified direction for a respective pair of adjacent pixel locations in the image pixel array;
   calculating, by a computerized normalized gradient image array generator from the plurality of gradient values contained in the gradient image array, normalized gradient image data in a normalized gradient image array, the normalized gradient image array containing a plurality of normalized gradient values of the normalized gradient image data;
   generating, by a computerized profile data generator, profile data by accumulating the plurality of normalized gradient values contained in the normalized gradient image array with reference to the specified direction;
   applying, by a computerized 1-dimensional (1-D) discrete Fourier transform (DFT) component, a 1-D DFT to the profile data to generate a plurality of DFT coefficients;
   establishing, by a computerized blockiness measurement component, a range of block size values for the plurality of blocks in the specified direction;
   generating, for each block size value by the computerized blockiness measurement component, an initial measurement of blocking artifacts in the digital image from peak magnitudes of the DFT coefficients, thereby obtaining a plurality of initial blocking artifact measurements;
   designating, by the computerized blockiness measurement component, a maximum one of the plurality of initial blocking artifact measurements as a final measurement of blocking artifacts in the digital image; and
   generating, by a computerized blockiness measurement output generator, an output indicative of the final measurement of blocking artifacts in the digital image.

11. The method of claim 10 wherein the calculating of the normalized gradient image data includes calculating the normalized gradient image data based at least in part on a predetermined subjective perceptual quality assessment of blocking artifacts.

12. The method of claim 10 wherein the generating of the measurement of blocking artifacts in the digital image includes generating the measurement of blocking artifacts in the digital image from the peak magnitudes of the DFT coefficients based at least in part on a predetermined subjective perceptual quality assessment of blocking artifacts.

13. The method of claim 10 further including generating, by the computerized blockiness measurement component, a plurality of measurements of blocking artifacts in the digital image with reference to a plurality of specified directions, and pooling, by a computerized blockiness measurement data pooling component, data corresponding to the plurality of measurements of blocking artifacts to generate an overall measurement of blocking artifacts in the digital image.

14. The method of claim 13 wherein the pooling of the data corresponding to the plurality of measurements of blocking artifacts includes pooling, by the computerized blockiness measurement data pooling component, the data corresponding to the plurality of measurements of blocking artifacts to generate the overall measurement of blocking artifacts in the digital image based at least in part on a predetermined subjective perceptual quality assessment of blocking artifacts.

15. The method of claim 10 wherein the specified direction corresponds to one of a vertical direction, a horizontal direction, a main diagonal direction, and a minor diagonal direction.

16. The method of claim 10 further including generating, by a computerized absolute value generating component, absolute values of the gradient image data to produce a plurality of absolute gradient values, wherein the calculating of the normalized gradient image data includes calculating, by the computerized normalized gradient image array generator, the normalized gradient image data by normalizing each absolute gradient value by an average of a specified number of gradient values calculated in the specified direction in a vicinity of the respective gradient value in the gradient image array.

17. The method of claim 10 wherein the digital image comprises a digital still image conforming to the JPEG standards.

18. The method of claim 10 wherein the digital image comprises a single digital image of an image sequence conforming to the MPEG or ITU-T H.26n standards.

19. A system for measuring blocking artifacts in a digital image, the digital image being divided into a plurality of blocks, the digital image having luminance and chrominance components, the system comprising:
   at least one memory; and
   at least one processor operative to execute at least one computer program out of the at least one memory:
   to generate, from at least one of the luminance and chrominance components of the digital image, image pixel data in an image pixel array corresponding to the digital image, the image pixel array having a plurality of pixel locations for pixel values of the image pixel data;
   to calculate gradient image data in a gradient image array from the image pixel data, the gradient image array containing a plurality of gradient values of the gradient image data, each of the plurality of gradient values corresponding to a respective gradient value calculated in a specified direction for a respective pair of adjacent pixel locations in the image pixel array;
   to calculate normalized gradient image data in a normalized gradient image array from the plurality of gradient values contained in the gradient image array based at least in part on a predetermined subjective perceptual quality assessment of blocking artifacts, the normalized gradient image array containing a plurality of normalized gradient values of the normalized gradient image data;
   to generate profile data by accumulating the plurality of normalized gradient values contained in the normalized gradient image array with reference to the specified direction;

to apply a 1-dimensional (1-D) discrete Fourier transform (DFT) to the profile data to generate a plurality of DFT coefficients;

to establish a range of block size values for the plurality of blocks in the specified direction;

for each block size value, to generate an initial measurement of blocking artifacts in the digital image from peak magnitudes of the DFT coefficients based at least in part on the predetermined subjective perceptual quality assessment of blocking artifacts, thereby obtaining a plurality of initial blocking artifact measurements;

to designate a maximum one of the plurality of initial blocking artifact measurements as a final measurement of blocking artifacts in the digital image; and to generate an output indicative of the final measurement of blocking artifacts in the digital image.

* * * * *